United States Patent
Maaref

(10) Patent No.: US 10,009,152 B2
(45) Date of Patent: Jun. 26, 2018

(54) SYSTEM AND METHOD FOR RATE-LESS MULTIPLE ACCESS

(71) Applicant: Amine Maaref, Ottawa (CA)

(72) Inventor: Amine Maaref, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/061,565

(22) Filed: Mar. 4, 2016

(65) Prior Publication Data
US 2017/0257195 A1 Sep. 7, 2017

(51) Int. Cl.
*H04B 15/00* (2006.01)
*H04L 5/00* (2006.01)
*H04L 27/26* (2006.01)

(52) U.S. Cl.
CPC .......... *H04L 5/0007* (2013.01); *H04L 5/0053* (2013.01); *H04L 27/2605* (2013.01)

(58) Field of Classification Search
CPC ....... H04B 14/046; H04B 14/04; H03M 1/00; H03M 2201/196; H03M 2201/4135; H03M 2201/4233; H03M 13/25; H04L 25/03343; H04L 25/4927; H04L 25/4975
USPC ................. 375/242–254, 259–285, 295–296
See application file for complete search history.

(56) References Cited

U.S. PATENT DOCUMENTS

| | | | | |
|---|---|---|---|---|
| 6,614,366 B2 * | 9/2003 | Luby | ................. | H03M 13/1191 341/50 |
| 7,869,539 B2 * | 1/2011 | Shapiro | ............... | H03M 13/353 375/285 |
| 8,553,796 B2 * | 10/2013 | Oyman | ................. | H04L 1/0019 375/267 |
| 8,595,590 B1 * | 11/2013 | Vojcic | .................. | H04L 1/0041 375/262 |
| 8,737,435 B2 * | 5/2014 | Jung | ........................ | H04J 3/24 370/535 |
| 9,258,043 B2 * | 2/2016 | Oyman | ................. | H04L 1/0019 |
| 9,369,255 B2 * | 6/2016 | Medard | ................. | H04L 5/0055 |
| 9,439,176 B2 * | 9/2016 | Maaref | .................... | H04W 4/08 |
| 9,445,279 B2 * | 9/2016 | Li | ........................ | H04W 88/16 |
| 9,544,757 B2 * | 1/2017 | Dao | .................... | H03M 13/373 |
| 9,755,715 B2 * | 9/2017 | Oyman | ................. | H04L 1/0019 |
| 2007/0195894 A1 * | 8/2007 | Shokrollahi | .......... | H04L 1/0041 375/242 |
| 2007/0217432 A1 * | 9/2007 | Molisch | ................. | H04B 7/026 370/400 |
| 2008/0165889 A1 * | 7/2008 | Shapiro | ............... | H03M 13/353 375/296 |

(Continued)

FOREIGN PATENT DOCUMENTS

| | | |
|---|---|---|
| CN | 101361296 A | 2/2009 |
| CN | 103944674 A | 7/2014 |

OTHER PUBLICATIONS

Erez, Uri, et al., "Rateless Coding for Gaussian Channels", IEEE Transactions on Information Theory, vol. 58, No. 2, pp. 530-547, Feb. 2012.

(Continued)

*Primary Examiner* — James M Perez

(57) ABSTRACT

Rate-less multiple access schemes for wireless networks uses physical layer, rate-less codes to enable grant-free, contention-based, random access and grant-based, contention-free, non-orthogonal multiple access in uplink or downlink channels.

27 Claims, 10 Drawing Sheets

(56) References Cited

U.S. PATENT DOCUMENTS

| | | | | |
|---|---|---|---|---|
| 2008/0181163 A1* | 7/2008 | Ye | H04L 1/1628 | 370/312 |
| 2009/0175214 A1* | 7/2009 | Sfar | H04B 7/15592 | 370/315 |
| 2009/0276811 A1* | 11/2009 | Ramaswamy | H04L 1/0041 | 725/73 |
| 2010/0003977 A1* | 1/2010 | Pinheiro | H04B 7/026 | 455/434 |
| 2010/0157901 A1* | 6/2010 | Sanderovitz | H04B 7/022 | 370/328 |
| 2011/0142073 A1* | 6/2011 | Jung | H04L 1/007 | 370/474 |
| 2011/0142141 A1* | 6/2011 | Huang | H03M 13/3761 | 375/242 |
| 2011/0150113 A1* | 6/2011 | Oyman | H04L 1/0019 | 375/260 |
| 2012/0069927 A1* | 3/2012 | Oyman | H04L 1/0019 | 375/285 |
| 2012/0117446 A1* | 5/2012 | Taghavi Nasrabadi | H04L 1/0003 | 714/776 |
| 2012/0213307 A1* | 8/2012 | Perry | H04L 1/0007 | 375/285 |
| 2013/0329661 A1* | 12/2013 | Chen | H04W 72/0453 | 370/329 |
| 2014/0010322 A1* | 1/2014 | Oyman | H04L 1/0019 | 375/267 |
| 2014/0022982 A1* | 1/2014 | Kim | H04L 1/0077 | 370/315 |
| 2014/0126580 A1* | 5/2014 | Sampath | H04L 1/1819 | 370/428 |
| 2014/0307665 A1* | 10/2014 | Sun | H04L 1/0003 | 370/329 |
| 2015/0003557 A1* | 1/2015 | Perry | H04L 1/0041 | 375/285 |
| 2015/0016360 A1* | 1/2015 | Merlin | H04W 72/0466 | 370/329 |
| 2015/0016426 A1* | 1/2015 | Merlin | H04W 72/0466 | 370/335 |
| 2015/0215133 A1* | 7/2015 | Cao | H04L 65/607 | 370/312 |
| 2015/0334712 A1* | 11/2015 | Maaref | H04W 72/0453 | 370/329 |
| 2015/0358113 A1* | 12/2015 | Callard | H04W 28/04 | 714/776 |
| 2016/0173237 A1* | 6/2016 | Braun | H04L 1/0056 | 370/242 |
| 2016/0365907 A1* | 12/2016 | Oyman | H04L 1/0019 | |
| 2017/0126832 A1* | 5/2017 | Dao | H04L 43/16 | |
| 2017/0142077 A1* | 5/2017 | Zhang | H04L 63/0428 | |
| 2017/0208455 A1* | 7/2017 | Au | H04W 76/10 | |
| 2017/0214491 A1* | 7/2017 | Maaref | H04L 1/0057 | |
| 2017/0237530 A1* | 8/2017 | Wesel | H04L 1/22 | 375/295 |
| 2017/0317894 A1* | 11/2017 | Dao | H04L 41/5012 | |

OTHER PUBLICATIONS

Gudipati, A., "Strider: Automatic Rate Adaptation and Collision Handling", SIGCOMM'11, Aug. 15-19, 2011.

Gudipati, A., et al., "AutoMAC: Rateless Wireless Concurrent Medium Access", ModiCom'12, Aug. 22-26, 2012.

Perry, J., et al., "Spinal Codes", SIGCOMM/12, Aug. 12-17, 2012.

Sun, U., et al., "Scheduling of Multicast and Unicast Services under Limited Feedback by using Rates Codes", IEEE Conference on Computer Communications, pp. 1671-1679, 2014.

Tian, S., et al. "A Physical-Layer Rateless Code for Wireless Channels", IEEE Transactions on Communications, vol. 61, No. 6, pp. 2117-2127, Jun. 2013.

* cited by examiner

SYSTEM AND METHOD FOR RATE-LESS MULTIPLE ACCESS

FIELD

The present application relates generally to adapting to time-varying wireless channels and, more specifically, to rate-less, multiple access schemes for such adapting.

BACKGROUND

In telecommunications and computer networks, a multiple access method allows several terminals connected to the same multi-point transmission medium to transmit over the medium and to share the capacity of the medium.

Grant-based orthogonal multiple access (OMA) schemes involve exclusively allocating frequency resource elements (REs) to users. Examples of grant-based OMA schemes include Orthogonal Frequency-Division Multiple Access (OFDMA) and Single Carrier Frequency-Division Multiple Access (SC-FDMA). For single-antenna transmissions, only one User Equipment (UE) can use a certain RE at a given time. In this manner, intra-cell interference may be avoided.

SUMMARY

Aspects of the present application relate to various proposals for rate-less multiple access schemes for wireless networks. It is proposed herein to use physical layer, rate-less codes to enable grant-free, contention-based, random access and grant-based, contention-free, non-orthogonal multiple access in uplink or downlink channels.

According to an aspect of the present disclosure, there is provided a method including obtaining, at a transmitter, a transport block for transmission, appending a cyclic redundancy check to the transport block, selecting a transmission resource unit, encoding, using physical layer rate-less coding, the transport block, thereby generating an encoded transport block and transmitting the encoded transport block to a receiver over the transmission resource unit. In another aspect of the present application, a transmitter is provided for carrying out this method.

According to optional aspects of the present application, the method may include scrambling the cyclic redundancy check, perhaps using an identifier of user equipment. Either the transmitter of the receiver may be user equipment.

According to a further aspect of the present disclosure, there is provided a method including receiving, at a receiver, signals on a transmission resource unit, storing the received signals, rate-less decoding a transport block from among the received signals, the transport block associated with a scrambled cyclic redundancy check, descrambling, using an identifier possibly associated with a transmitter of the transport block, the scrambled cyclic redundancy check to yield an unscrambled cyclic redundancy check, and transmitting, to the transmitter of the transport block, a positive acknowledgement. In another aspect of the present application, a receiver is provided for carrying out this method.

According to a still further aspect of the present disclosure, there is provided a method including dividing a transport block into a plurality of layers, appending, to each layer, a cyclic redundancy check, encoding, with a fixed-rate forward error correcting code, each layer among the plurality of layers to yield a plurality of encoded layers, weighting, using respective random phase vectors, each encoded layer among the plurality of encoded layers to yield a plurality of weighted layers, modulating each weighted layer among the plurality of weighted layers to yield a plurality of modulated layers, power adjusting, with respective power adjustment factors, each modulated layer among the plurality of modulated layers to yield a plurality of power adjusted layers and superimposing the plurality of power adjusted layers to form a PLRC-encoded transport block. In another aspect of the present application, a transmitter is provided for carrying out this method.

According to an even further aspect of the present disclosure, there is provided a method comprising dividing a transport block into a plurality of layers, appending, to each layer, a cyclic redundancy check, encoding, with a fixed-rate forward error correcting code, each layer among the plurality of layers to yield a plurality of encoded layers, weighting, using respective random phase vectors, each encoded layer among the plurality of encoded layers to yield a plurality of weighted layers, modulating each weighted layer among the plurality of weighted layers to yield a plurality of modulated layers, power adjusting, with respective power adjustment factors, each modulated layer among the plurality of modulated layers to yield a plurality of power adjusted layers and superimposing the plurality of power adjusted layers to form an encoded transport block.

According to optional aspects of the present application, the method may include linearly combining the encoded transport block with other encoded transport blocks to form and transmit a set of linearly combined encoded transport blocks, perhaps repeating the transmitting the set of linearly combined encoded transport blocks. The method may further include receiving an acknowledgement of receipt of one encoded transport block among the set of linearly combined encoded transport blocks and responsive to the receiving the acknowledgement, removing the one encoded transport block from the set of linearly combined encoded transport blocks and adding a new encoded transport block to the linearly combined set of encoded transport blocks.

According to a still further aspect of the present disclosure, there is provided a transmitter comprising a transport block divider configured to divide a transport block into a plurality of layers, a plurality of encoders. The encoders may be configured to append, to each layer, a cyclic redundancy check and encode, with a fixed-rate forward error correcting code, a respective layer among the plurality of layers to yield a plurality of encoded layers. The transmitter may further include a plurality of adders configured to weight, using respective random phase vectors, a respective encoded layer among the plurality of encoded layers to yield a plurality of weighted layers, a plurality of modulators configured to modulate a respective weighted layer among the plurality of weighted layers to yield a plurality of modulated layers, a plurality of multipliers configured to power adjust, with respective power adjustment factors, a respective modulated layer among the plurality of modulated layers to yield a plurality of power adjusted layers and a superimposing adder configured to superimpose the plurality of power adjusted layers to form an encoded transport block.

Other aspects and features of the present disclosure will become apparent to those of ordinary skill in the art upon review of the following description of specific implementations of the disclosure in conjunction with the accompanying figures.

BRIEF DESCRIPTION OF THE DRAWINGS

Reference will now be made, by way of example, to the accompanying drawings which show example implementations; and in which.

DETAILED DESCRIPTION

Figure 1:
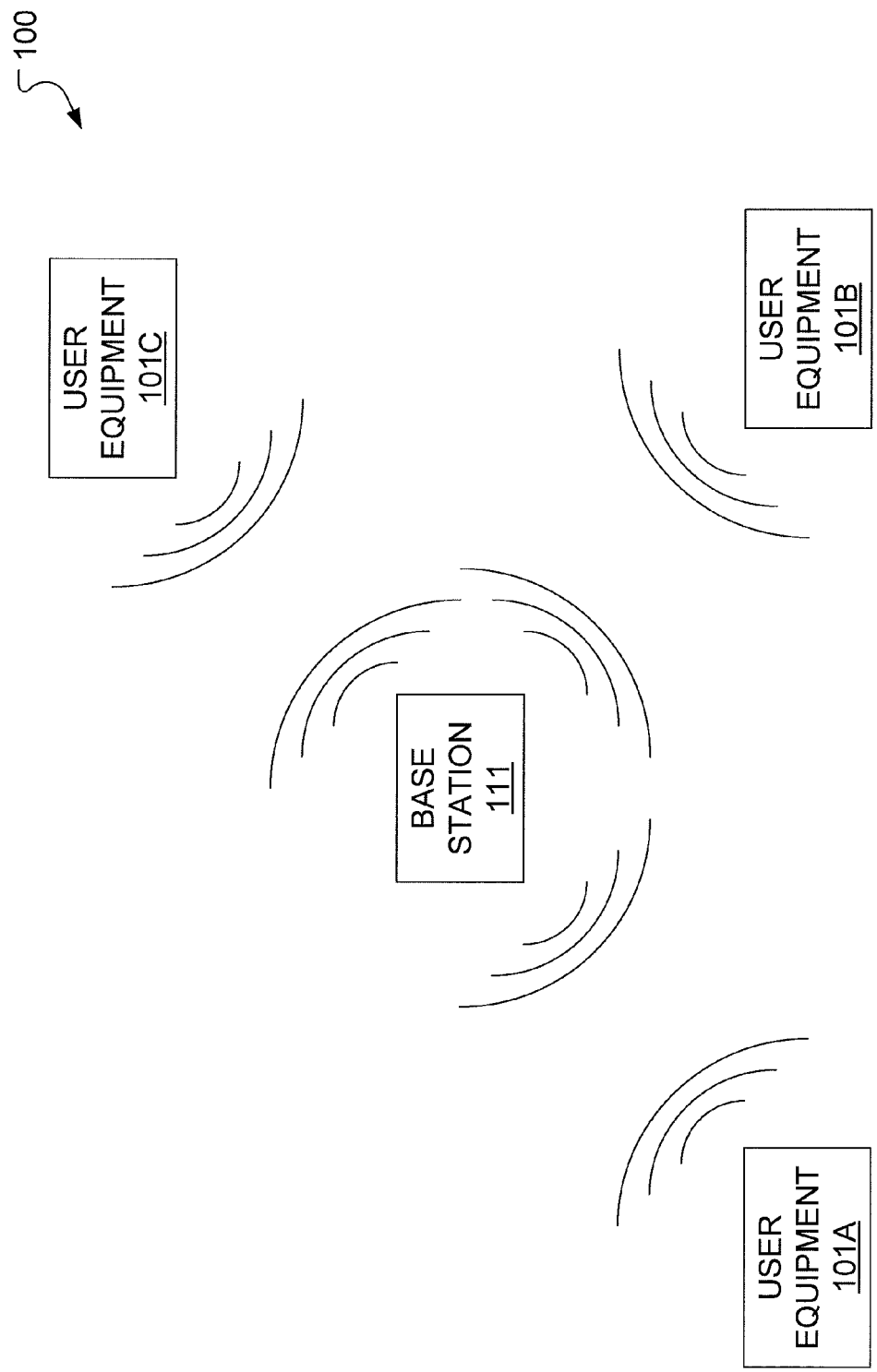
FIG. 1 illustrates an environment suitable for implementation of aspects of the present application, the environment includes a base station and multiple examples of user equipment (UE)

In a single transmit-antenna OMA context, when REs are allocated to users, these allocated REs are not available to be assigned to other users. Accordingly, OMA may be considered sub-optimal when compared to non-orthogonal multiple access schemes. Various types of non-orthogonal multiple access schemes are known as Sparse Multiple Access (SCMA), Semi-Orthogonal Multiple Access (SOMA) and Non-Orthogonal Multiple Access (NOMA). The sub-optimality may be in terms of achievable spectral efficiency and in terms of ensuring fairness among users.

Grant-free, contention-based, random access schemes such as carrier-sense multiple access (CSMA) schemes exist. One example of standards that employ a form of CSMA known as distributed coordination function (DCF) is known by the reference number 802.11xx from the Institute for Electrical and Electronics Engineers (IEEE), which is more commonly referred to as "WiFi." Such CSMA schemes may rely on control traffic mechanisms, such as Request to Send (RTS) and Clear to Send (CTS), to reduce frame collisions (simultaneous transmissions on the same time-frequency resources), hence the term collision avoidance (CA) appended to CSMA. Such CSMA schemes may also include time and/or frequency-domain backoff mechanisms to avoid collisions. These mechanisms may be considered inefficient in terms of achievable spectral efficiency and signaling overhead (e.g., RTS/CTS).

Another example of a standard that may rely on some form of contention-based multiple access or listen-before talk (LBT) mechanism is known as Licensed Assisted Access Long-Term Evolution (LAA LTE). Current wireless systems (e.g., cellular LTE/LTE-A, 802.11xx (WiFi), LAA-LTE) rely on feedback from a receiver and use fixed, discrete-rate Modulation and Coding Scheme (MCS) adaptation tables to adapt to time-varying wireless channels. It is known that wireless channels are often susceptible to time-varying variations in channel condition, such as interference, noise and multipath fading. It may be considered that these reactive mechanisms, which have a reliance on feedback from a receiver, are sub-optimal.

Reactive mechanisms may be considered to suffer from inaccuracies due to feedback delay and channel estimation errors. In operation, reactive mechanisms allow for channel degradation due to fading, interference and noise measured at the receiver and feedback identifying the extent of the degradation of the channel is then sent, as feedback, to the transmitter. Unfortunately, by the time the feedback reaches the transmitter and is used, at the transmitter, for scheduling, the degradation of the channel may have changed.

Aspects of the present application relate to a proposal for a rate-less multiple access scheme for wireless networks of the type used in cellular LTE/LTE-A systems. It is proposed herein to use physical layer, rate-less codes to enable grant-free, contention-based, random access and grant-based, contention-free, non-orthogonal multiple access in uplink or downlink channels.

FIG. 1 illustrates an environment 100 suitable for implementation of aspects of the present application. In the environment 100 of FIG. 1, a base station 111 is arranged to communicate in a bidirectional and wireless manner with multiple examples of user equipment (UE). Three example UEs are illustrated in FIG. 1: a first UE 101A; a second UE 101B; and a third UE 101C. The UEs are collectively or individually associated herein with reference numeral 101.

Figure 2:
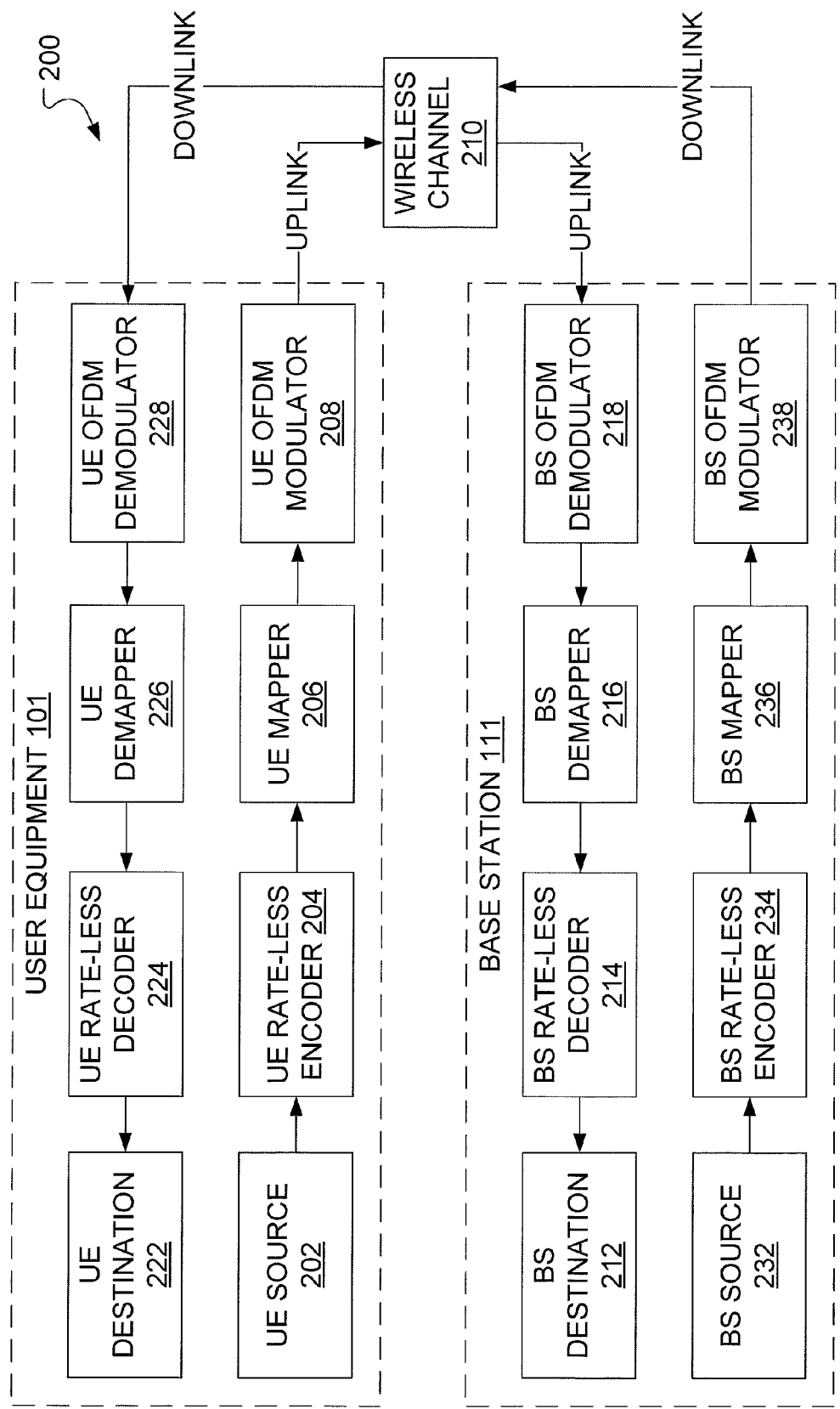
FIG. 2 illustrates a system operable to implement aspects of the present application, including one of the UEs from FIG. 1 in communication with the base station, the base station includes a BS rate-less encoder, among other elements.

FIG. 2 illustrates a system 200 operable to implement aspects of the present application. The system 200 includes one of the UEs 101 from FIG. 1 in communication with the base station 111.

For uplink operation, the UE 101 includes a UE data source 202, which connects to a UE rate-less encoder 204, which, in turn, connects to a UE mapper 206, which, in turn, connects to a UE Orthogonal Frequency-Division Multiplexing (OFDM) modulator 208. The base station (BS) 111 includes a BS data destination 212, which connects to a BS rate-less decoder 214, which, in turn, connects to a BS demapper 216, which, in turn, connects to a BS OFDM demodulator 218. In operation, for an uplink, output from the UE OFDM modulator 208 is transmitted over a wireless channel 210 and received by the BS OFDM demodulator 218.

For downlink operation, the BS 111 a BS data source 232, which connects to a BS rate-less encoder 234, which, in turn, connects to a BS mapper 236, which, in turn, connects to a BS OFDM modulator 238. The UE 101 includes a UE data destination 222, which connects to a UE rate-less decoder 224, which, in turn, connects to a UE demapper 226, which, in turn, connects to a UE OFDM demodulator 228. In operation, for a downlink, output from the BS OFDM modulator 238 is transmitted over the wireless channel 210 and received by the UE OFDM demodulator 228.

In overview, for the system 200 of FIG. 2, it is proposed herein to use, at the UE rate-less encoder 204 and the BS rate-less encoder 234, rate-less codes at the physical layer. The use of rate-less codes at the physical layer stands in contrast to the use of rate-less codes at the application layer. Rate-less codes at the application layer have been, to this point, considered to be suitable for erasure channels and fixed-rate codes have been used at the physical layer.

When rate-less coding is employed to encode an upper-layer message and a transport block is not successfully decoded at the physical layer, the unsuccessfully decoded transport block is typically discarded and, accordingly, does not contribute towards the decoding of the upper-layer message.

When, as is proposed herein, rate-less coding is employed, instead, at the physical layer, each received transport block contributes to an accumulation of information at the receiver, even though a particular received transport block may not be decodable by itself. When rate-less coding is employed at the physical layer, it may be called Physical Layer Rate-less Coding (PLRC).

Recently proposed rate-less codes, such as linear Layered codes, which are low-complexity rate-less codes employing layered encoding, successive decoding (i.e., using successive interference cancellation (SIC) receiver algorithms) and time-repetition using random weight factors, of which StriDer (Stripping Decoder) rate-less codes are a special case, and non-linear Spinal codes, can be shown to achieve the capacity of Additive White Gaussian Noise (AWGN) channels.

Conveniently, physical layer rate-less codes may be seen to allow a system designer to obviate link budget margins because the rate-less codes naturally and dynamically adapt to varying channel conditions.

As discussed hereinbefore, current wireless networks, such as Wireless Local Area Networks (WLAN) and cellular networks, often rely on explicit and reactive link adaptation policies to dynamically select a transmission configuration from among a limited choice of pre-determined physical layer transmission configurations. Such link adaptation policies may be, for example, based on specific physical layer configurations and UE feedback. Example physical layer configurations include configurations available from Modulation and Coding Scheme look-up tables and configurations based on constellation mapping.

In contrast, physical layer rate-less codes constitute a special sub-class of Forward Error Correcting (FEC) codes. In rate-less FEC codes, a sequence of coded bits (symbols) used when the code achieves a relatively high code rate are arranged as a prefix to a sequence of coded bits (symbols) used when the code achieves a relatively lower code rate.

In telecommunication and information theory, the code rate (or information rate) of a forward error correction code is the proportion of the data-stream that is useful (non-redundant). That is, if the code rate is k/n, for every k bits of useful information, the encoder generates n bits of data, of which n−k are redundant.

The prefix property employed in rate-less FEC codes allows the rate-less decoder 214 (FIG. 2) to process coded data incrementally until enough information has been accumulated so that successful decoding becomes possible. By doing so, explicit link adaptation becomes unnecessary.

Fountain codes, such as Raptor codes and Luby Transform codes (LT codes), are known to be employed for erasure channels where transport blocks are lost with some probability. Fountain codes are often used at higher layers to provide more reliability when the channel condition is unknown or difficult to predict. However, the performance of Fountain codes under noisy channels is an open problem.

It is proposed herein to employ PLRC in the context of two distinct non-orthogonal multiple access schemes: grant-based, contention-free, non-orthogonal multiple access; and grant-free, contention-based, non-orthogonal multiple access.

For an uplink in the scheme called grant-based, contention-free, non-orthogonal multiple access, the BS 111 may grant access to a certain radio resource to multiple UEs 101.

The term "radio resource" is used herein to denote a physical time-frequency radio resource such as a resource element (RE) or a resource block (RB). Each UE 101 encodes, in a rate-less manner, a transport block (TB) using a PLRC and continues transmitting encoded versions of the TB until the TB is acknowledged by the BS 111.

Once the BS 111 sends an acknowledgement to one of the UEs, the BS 111 can grant access to the same, or another, UE 101 to transmit on the same resource, thus maintaining, or increasing the number of UEs 101 simultaneously transmitting on the same resource.

For a downlink in the scheme called grant-based, contention-free, non-orthogonal multiple access, the BS 111 may assign the same resource to multiple UEs 101 in a manner similar to the grant of access in the uplink instance. The BS 111 may linearly combine respective PLRC encoded and power-adjusted symbols into a combined signal before transmitting the combined signal to the simultaneously assigned UEs 101.

The downlink transmitted signal from the BS 111 to the UE 101 can be expressed as:

$$x = \sqrt{P_1}x_1 + \sqrt{P_2}x_2 + \quad . \quad . \quad . \quad + \sqrt{P_K}x_K,$$
$$\Sigma_{k=1,\ldots,K} P_K = P, E[|x_i|^2]. \quad (1)$$

With linear PLRC, different "layers" are linearly combined and transmitted at once as a single block encoded in a rate-less manner. As will be discussed hereinafter, inserting a cyclic redundancy check (CRC) for each layer is optional but could speed up decoding process and save receiver energy.

Figure 3:
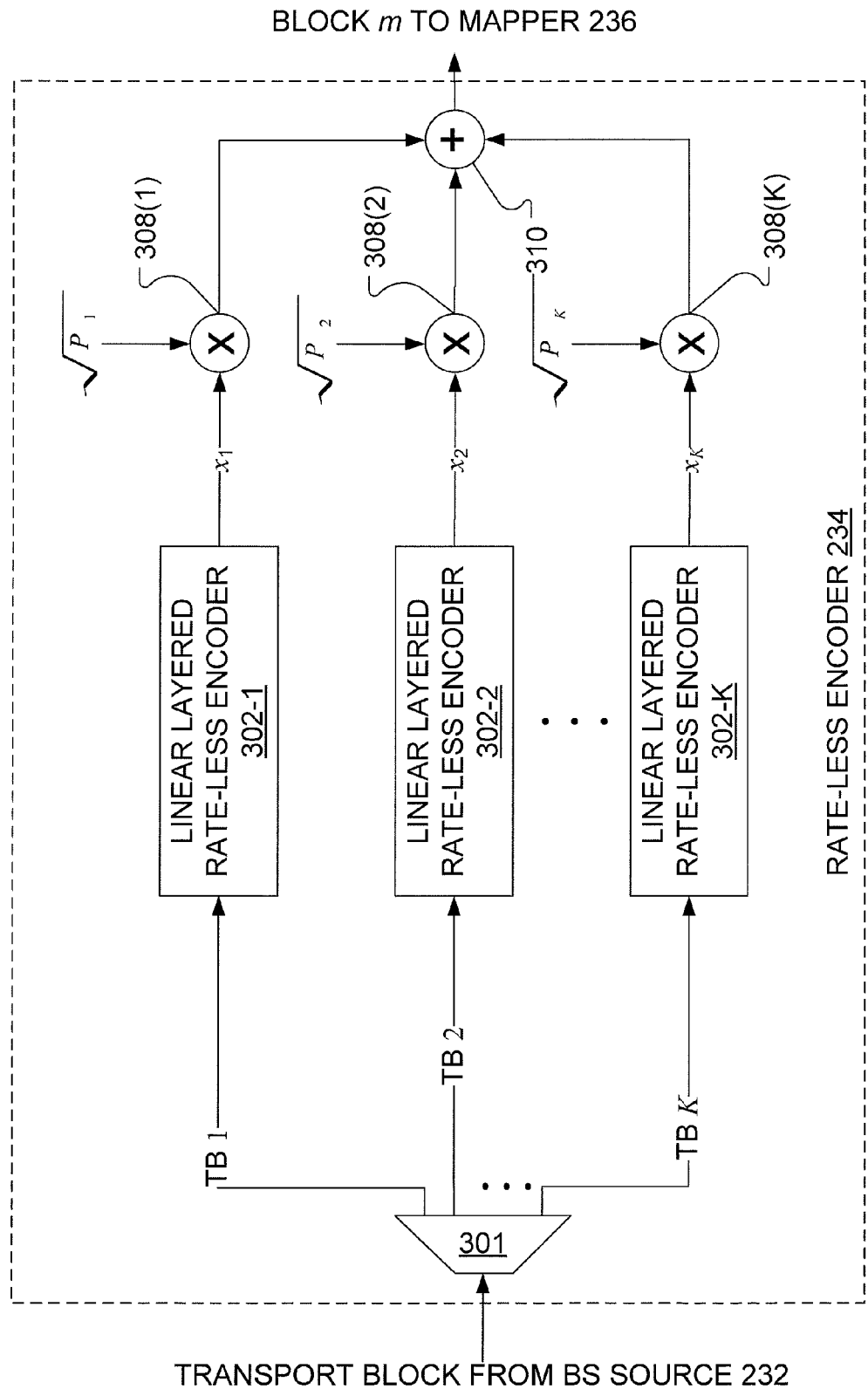
FIG. 3 illustrates the BS rate-less encoder of FIG. 2 configured to employ linear, layered Physical Layer Rate-less Coding (PLRC) by way of a plurality of linear layered rate-less encoders, in accordance with one embodiment of the present application.

FIG. 3 illustrates the BS rate-less encoder 234, of the base station 111 of FIG. 2, configured to employ linear, layered PLRC. In operation of the BS rate-less encoder 234, a divider 301 receives information bits from the BS source 232 and divides the bits into K transport blocks. Each of the K transport blocks is received at a corresponding one of a plurality of linear layered rate-less encoders 302-1, 302-2, . . . , 302-K (individually or collectively, 302). Notably, the BS rate-less encoder 234 of FIG. 3 embodies equation (1).

At an example linear layered rate-less encoder 302 among the plurality of linear layered rate-less encoders 302, a transport block divider 401 receives a transport block and divides the transport block into L chunks, or "layers."

Figure 5:
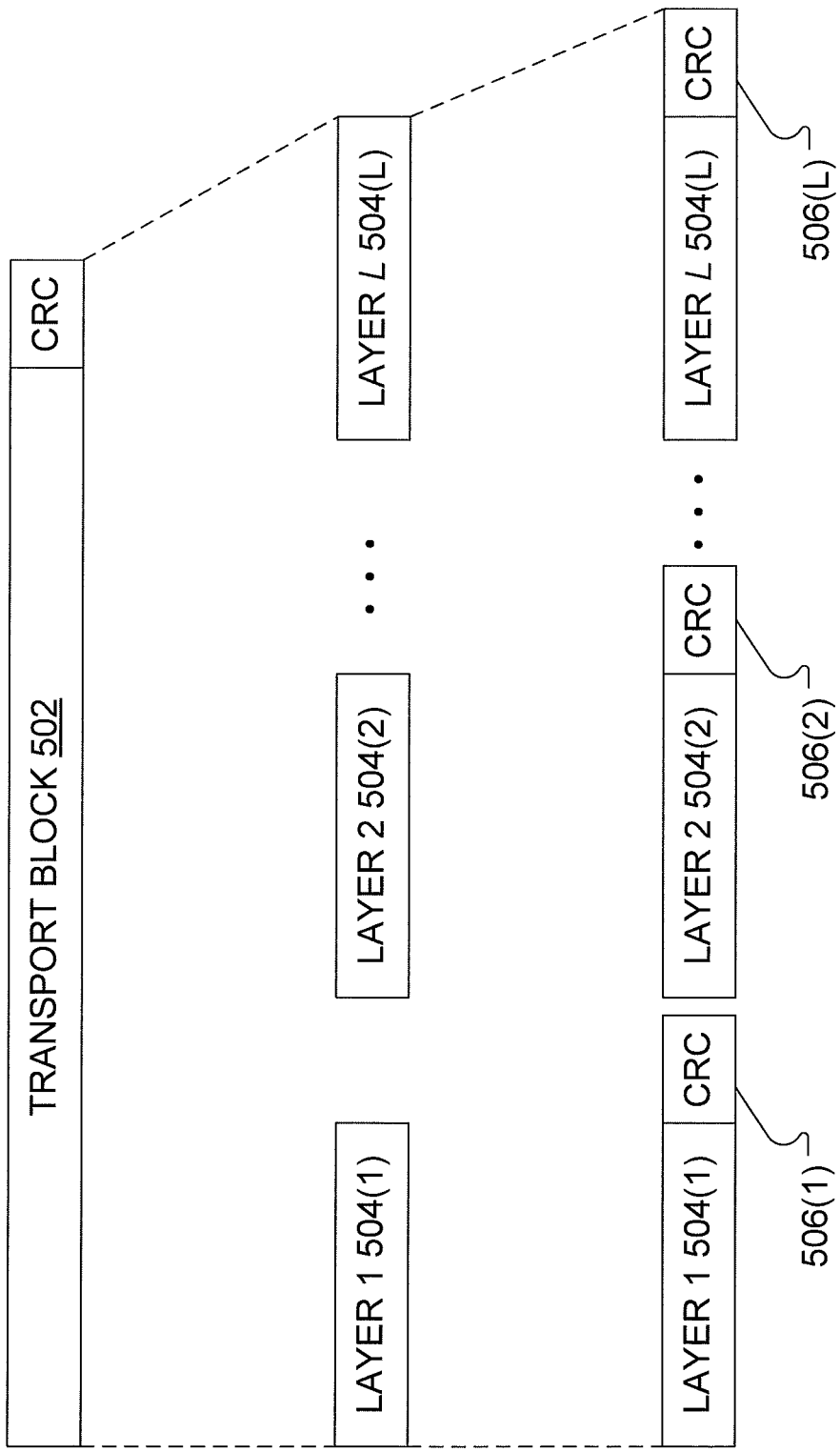
FIG. 5 illustrates division of a transport block into layers.

For example, FIG. 5 illustrates division of a transport block 502 into a layer 1 504(1), a layer 2 504(2), . . . , and a layer L 504(L) (collectively or individually 504). The example linear layered rate-less encoder 302-$u$ then processes each of the L layers 504 in a distinct path.

A first path, for processing the layer 1, includes a first basic encoder 402(1), a first adder 404(1), a first Quadrature Phase Shift Keying (QPSK) modulator 406(1) and a first multiplier 408(1). A second path, for processing layer 2, includes a second basic encoder 402(2), a second adder 404(2), a second QPSK modulator 406(2) and a second multiplier 408(2). An $L^{th}$ path, for processing the layer L, includes a $L^{th}$ basic encoder 402(L), an $L^{th}$ adder 404(L), a $L^{th}$ QPSK modulator 406(L) and a $L^{th}$ multiplier 408(L).

Each layer is encoded, using a base code with rate $R_0$, weighted using a random phase vector $d_k$, modulated and power adjusted with power adjustment factor, $\sqrt{P_{m,k}{}^u}$, (where m is a time index and u is a user index). For example, layer 1 is encoded, by the first basic encoder 402(1) using a base code with rate $R_1$, weighted, by the first adder 404(1), using a random phase vector $d_1$, modulated, by the first QPSK modulator 406(1), and power adjusted, by the first multiplier 408(1), with a power adjustment factor, $\sqrt{P_{m,1}{}^u}$.

The example linear layered rate-less encoder 302-u linearly superimposes all processed layers, at a superimposing adder 410, to form a single, PLRC-encoded transport block. In view of FIG. 3, a transport block, $x_n$, from each linear layered rate-less encoder 302 is power weighted at a corresponding multiplier 308, with a corresponding power weighting factor $\sqrt{P_u}$, multiplexed together into a block at an adder 310 and passed to the mapper 236.

Figure 6:
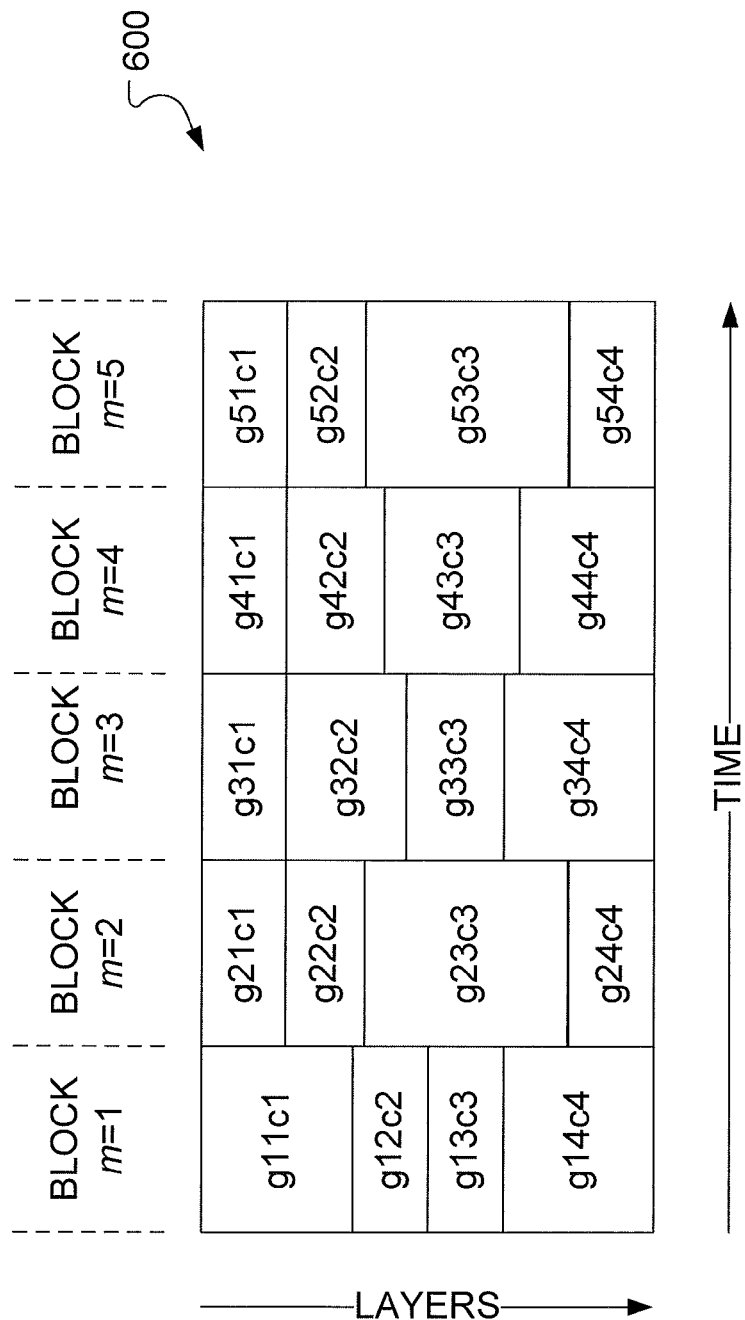
FIG. 6 illustrates a set including M linearly combined PLRC-encoded transport blocks.

A set 600 including M linearly combined PLRC-encoded transport blocks, where M=5 and L=4, is illustrated in FIG. 6. In FIG. 6, one encoded TB corresponds to one of the columns. The different columns represent the time dimension. That is, FIG. 6 represents output of the rate-less encoding process for one TB of one UE 101. The BS 111 can multiplex several rate-less encoded TB, corresponding to several UEs 101, over the same time-frequency resources on the downlink. Similarly on the uplink, each UE 101 will separately transmit one ratelessly encoded TB over the set of assigned time-frequency resources. The set of ratelessly encoded TBs transmitted concurrently by the different UEs 101 will combine over the air (unlike the downlink case where the combining happens at the BS 111) and arrive at the BS 111, which will proceed to the joint decoding of the received signals.

The BS 111 may repeatedly transmit a linearly combined set of PLRC-encoded transport blocks, such as the set 600 illustrated in FIG. 6, until the BS 111 receives an individual acknowledgement for one of the PLRC-encoded transport blocks. Responsive to having received the acknowledgement, the BS 111 may remove the acknowledged PLRC-encoded transport block from the set 600 of linearly combined PLRC-encoded transport blocks and add a new PLRC-encoded transport block to the set of linearly combined PLRC-encoded transport blocks.

A signal received at the UE 101, after M rate-less transmissions by the BS 111, can be expressed as:

$$\begin{bmatrix} y_1 \\ \vdots \\ y_M \end{bmatrix} = G \begin{bmatrix} c_1 \\ \vdots \\ c_L \end{bmatrix} + \begin{bmatrix} n_1 \\ \vdots \\ n_M \end{bmatrix},$$

where G(n) is an M×L complex gain matrix capturing random phase and power scaling effects, where $c_1, \ldots, c_L$; $y, \ldots, y_M$ and $n, \ldots, n_M$ are row vectors of length N, representing the basic layer codewords (c), the received signals (y) and additive white Gaussian noise (AWGN) (n) corresponding to the basic layer codewords, respectively.

The receiver (the BS 111 on an uplink, the UE 101 on a downlink) may employ joint reception and or successive decoding with interference cancellation to recover transport blocks transmitted by various UEs 101.

The BS 111 may, for example, use successive decoding, wherein transport blocks from all concurrently transmitting UEs 101 are successively decoded according to a certain order while considering, as noise, received transport blocks from other, simultaneously transmitting, UEs 101. When the UE 101 is receiving, there is no need to successively decode. Once the particular UE 101 has decoded the transport block that is intended for the particular UE 101, the remainder may be discarded.

When a transport block received from a UE 101 has been successfully decoded (CRC checked), the contribution of the successfully decoded transport block may be removed from the stored combined received signal.

The BS 111 may then commence to decode the next transport block (from a distinct UE 101) in the predetermined decoding order, and so on, until all transport blocks are successfully decoded.

The BS 111 may evaluate an effective decoding SINR for each particular UE 101, given the decoding order of the particular UE 101, and can send pre-emptive acknowledgment (PreAck) to the particular UE 101 when the effective decoding SINR, after a number M of rate-less transmissions, surpasses a certain threshold (specific to PLRC), $$SINR_{effective}(M) = \frac{\sum_{i=1,\ldots,M} P_i h_i}{I + N},$$

where I denotes the interference from signals that are to be decoded after the target signal, N is the noise power at the BS, $P_i$ is the power of each transmitted transport block and $h_i$ denotes the corresponding channel.

When a transport block from a particular UE 101 is pre-emptively acknowledged, the base station 111 can assign the resource to another UE 101, even though the preemptively acknowledged transport block is not yet fully decoded. Notably, it is expected that the transport block may be fully decoded after signals from other concurrently transmitting UEs 101, which come earlier in the predetermined decoding order, are fully decoded and their interference cancelled.

However, upon determining that decoding of the preemptively acknowledged transport block has failed, i.e., the CRC check has failed, the base station 111 may request further rate-less transmissions of preemptively acknowledged transport blocks.

To handle the evaluation of scheduling fairness when granting of access to various resources, the BS 111 may include a semi-persistent multi-user simultaneous transmission (MUST) scheduler (not shown). When evaluating scheduling fairness, the MUST scheduler may take into consideration the predetermined decoding order of the various UEs 101. The MUST scheduler may adjust a number of simultaneously and semi-persistently scheduled UEs 101 based on transmissions of actual acknowledgements and/or preemptive acknowledgements. Requests further rate-less transmissions of preemptively acknowledged transport blocks when decoding of the transport block fails, as determined (step 810) when the CRC check fails.

In a grant-free, contention-based rate-less random access scheme, users can randomly access the wireless channel without a request, to the BS 111, for a grant of access to radio resources. Rate-less codes are employed at the physical layer in a manner intended to replace the known use of fixed-rate codes. As the transmitter progressively sends, to the receiver, transport blocks encoded using a PLRC, the transmitter (one of the UE 101 or the BS 111) may decrease the code rate over time. Once the code rate drops below an empirical channel capacity, the receiver (the other one of the UE 101 or the BS 111) may decode the message and send an acknowledgement to the transmitter.

Rate-less codes may be shown to significantly decrease the amount of ACK feedback because, contrary to fixed-rate codes, rate-less codes do not require an ACK/NACK for every single transmission. It can be illustrated that PLRCs provide inherent robustness against random access collisions.

Figure 7:
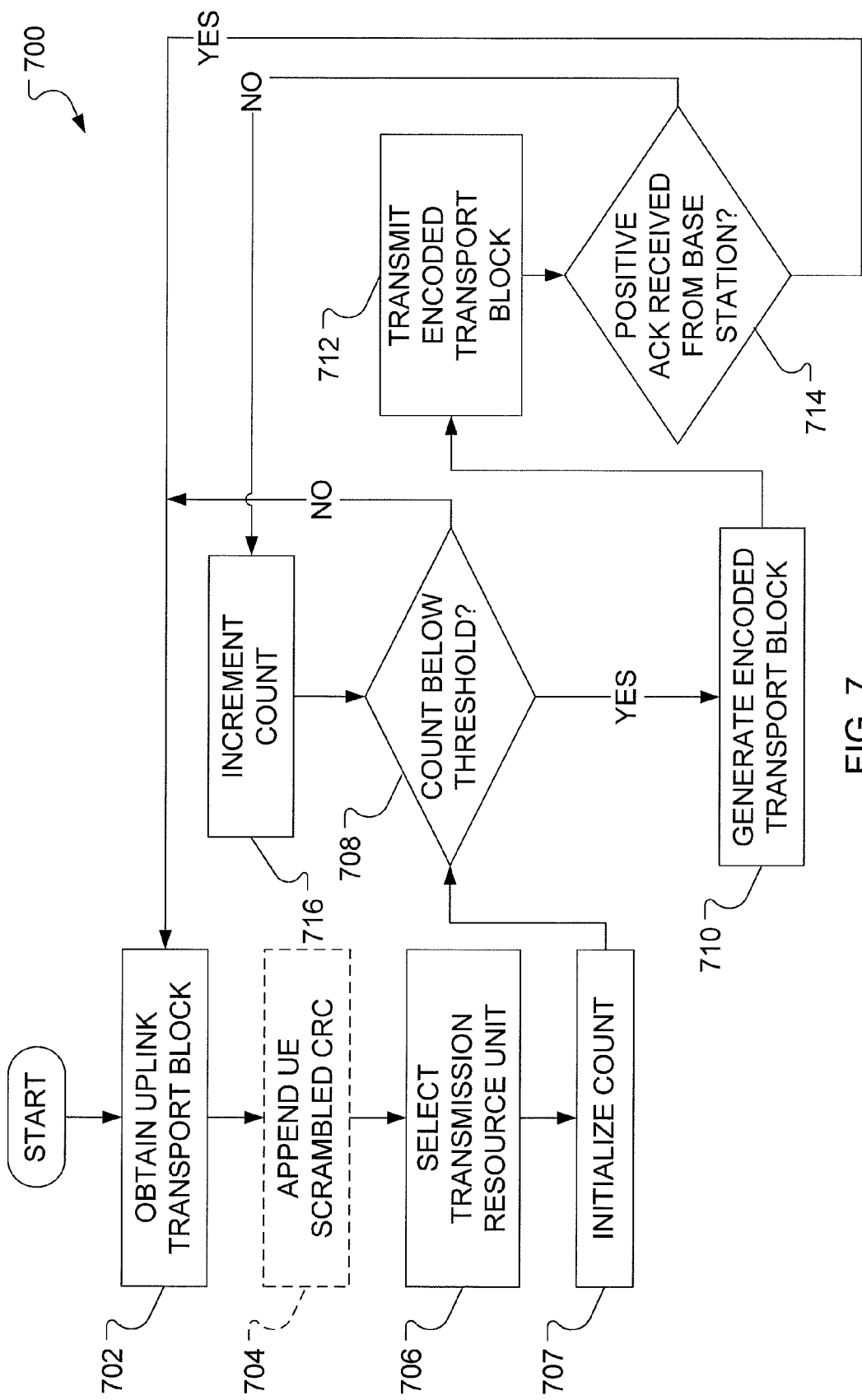
FIG. 7 illustrates example steps in a method for uplink transmission of encoded transport blocks in a grant-free, contention-based rate-less random access scheme.

FIG. 7 illustrates steps in an example method 700 for uplink transmission of encoded transport blocks in a grant-free, contention-based rate-less random access scheme.

Initially, the UE 101 obtains (step 702) an uplink transport block. The uplink transport block may, for example, be obtained (step 702) from an uplink transmission queue (not shown). The UE rate-less encoder 204 may include a transport block divider, such as illustrated in the BS rate-less encoder 234 of FIG. 3 and, using the transport block divider, may divide the obtained transport block into layers 504 (see FIG. 5). The UE 101 may optionally append (step 704) a CRC 506 to each of the layers 504. Further optionally, the UE 101 may scramble each CRC before appending the respective layer with the CRC. Indeed, the UE 101 may scramble the CRC in a manner that is specific to the UE 101 by basing the scrambling on an identifier (ID) associated with the UE 101, i.e., a UE ID, which may be known to the BS 111. In one instance, the UE ID may be explicitly included in a header of the obtained transport block. In another instance, the UE ID may be implicitly embedded in the obtained transport block.

The UE 101 may then select (step 706) a grant-free, contention-based transmission resource unit. The selection (step 706) may, in some instances, be made from among a plurality of grant-free transmission resource units that have been announced a-priori by the base station 111.

Upon selecting (step 706) a transmission resource unit, the UE 101 may then initialize (step 707) a count of rate-less transmissions and determine (step 708) whether a count of rate-less transmissions, for the current transport block, exceeds a threshold.

Upon determining (step 708) that the count of rate-less transmissions for the current transport block does not exceed the threshold, the UE 101 may encode the received transport block to generate (step 710) an encoded transport block.

The UE 101 may then transmit (step 712) the encoded transport block. Notably, the UE 101 may transmit (step 712) the encoded transport block without two-way synchronization. The UE 101 may listen until the UE 101 has acquired rough synchronization. The Base Station 111 may respond with timing information for finer synchronization.

The UE 101 may then determine (step 714) whether a positive acknowledgement has been received from the BS 111. Upon determining (step 714) that a positive acknowledgement has not been received from the BS 111, the UE 101 may proceed to increment (step 716) the count of rate-less transmissions. Notably, a lack of positive acknowledgement may indicate that the BS 111 has repurposed the resources selected in step 706 for scheduled traffic.

Again, upon determining (step 708) that the count of rate-less transmissions for the current transport block does not exceed the threshold, the UE 101 may encode the transport block to generate (step 710) a further encoded transport block. The UE 101 may then transmit (step 712) the further encoded transport block.

The UE 101 may then determine (step 714) whether a positive acknowledgement has been received from the BS 111. Upon determining (step 714) that a positive acknowledgement has been received from the BS 111, the UE 101 may proceed to obtain (step 702) another uplink transport block from the uplink transmission queue.

Upon determining (step 708) that the count of rate-less transmissions exceeds the threshold, the UE 101 returns to obtaining (step 702) another uplink transport block. That is, after trying multiple times to transmit the transport block and failing to receive an acknowledgement, the UE 101 may give up trying to send that transport block.

As an alternative to using a count that is initialized (step 707) and incremented (step 716), the UE 101 may employ a timer. In a manner similar to the count, the timer may be initialized. However, the timer is expected to proceed independent of further instructions. That is, it is unnecessary to increment the timer. Rather than determining (step 708) whether a count of rate-less transmissions, for the current transport block, exceeds a threshold, the UE may, instead, determine whether a time allotted for transmitting an encoded transport block and receiving a positive acknowledgement has expired.

Upon expiry of the timer, the UE 101 may select (step 706) a different grant-free transmission resource unit or do a random backoff and retransmit using the same grant-free transmission resource unit.

Although the method 700 of FIG. 7 has been described as being carried out by the UE 101 in the context of an uplink transmission to the base station 111, it should be clear that, with minor variations, the method 700 of FIG. 7 may be carried out by the base station 111 in the context of a downlink transmission to the UE 101. In one example variation, the scrambling of the CRC, before the optional appending (step 704) of the CRC to the transport block, may be based on the UE ID associated with the UE 101 to which the BS 111 is transmitting the transport block. In another example variation, the positive acknowledgement for which a determination (step 714) is made, is received from the UE 101.

Figure 8:
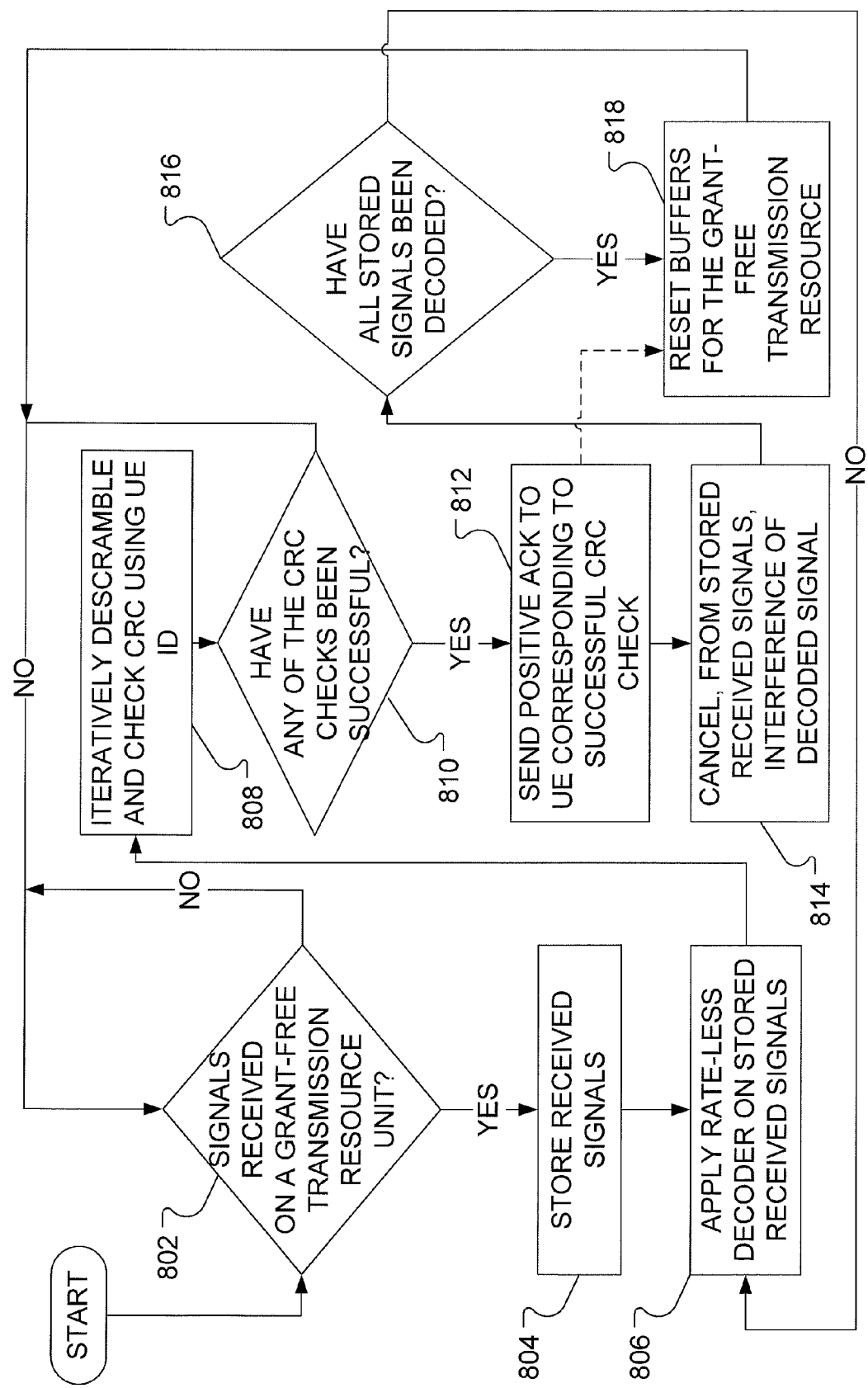
FIG. 8 illustrates example steps in a method for uplink reception of encoded transport blocks in a grant-free, contention-based rate-less random access scheme

FIG. 8 illustrates example steps in a method 800 for uplink reception of encoded transport blocks in a grant-free, contention-based rate-less random access scheme.

Initially, the BS 111 determines (step 802) whether signals have been received on a grant-free, contention-based transmission resource unit over the course of a transmission time interval (TTI). Upon determining (step 802) that signals have been received, the BS 111 stores (step 804) the signals for one TTI. The signals may be stored (step 804), for example, in memory buffers associated with the grant-free, contention-based transmission resource unit. At the conclusion of a TTI during which signals have been stored, the BS 111 then proceeds to apply (step 806) the rate-less decoder 214 to the stored received signals. Upon decoding a transport block, the BS 111 may identify the CRC portion of the transport block and iteratively descramble (step 808) the CRC portion. Once the CRC is descrambled, the CRC may be used to check that the transport block has been properly decoded. Descrambling (step 808) the CRC may, for example, involve using each of multiple UE IDs that have been previously mapped to the grant-free, contention-based transmission resource unit. As discussed hereinbefore, each UE 101 may scramble the CRC for a transport block in a manner that is specific to the UE 101 by basing the scrambling on the UE ID associated with the UE 101.

The BS 111 may then determine (step 810) whether any of UE IDs led to an appropriately descrambled CRC that confirmed proper decoding of the transport block. Notably, the UE IDs that are used in the various attempts to descramble the CRC may form a subset of all of the UE IDs. The subset may comprise the UE IDs associated with the UEs 101 to which the BS 111 has announced, as available, the grant-free transmission resource unit.

On one hand, upon determining (step 810) that one of the CRC checks was successful, the BS 111 may transmit (step 812) a positive acknowledgement to the UE 101 corresponding to the UE ID that led to an appropriately descrambled CRC that confirmed proper decoding of the transport block.

On the other hand, upon determining (step 810) that none of the CRC checks was successful, the BS 111 may recommence determining (step 802) whether signals have been received on the grant-free, contention-based transmission resource unit.

After transmitting (step 812) the positive acknowledgement, the BS 111 may simply reset (step 818) the memory buffers, where the received signals were stored (step 804), and may recommence determining (step 802) whether signals have been received on the grant-free, contention-based transmission resource unit.

Alternatively, after transmitting (step 812) the positive acknowledgement, the BS 111 may proceed to cancel (step 814), from the stored received signals, the interference due to the successfully decoded transport block. The BS 111 may then determine (step 816) whether all stored received signals have been decoded. Upon determining (step 816) that all stored received signals have been decoded, the BS 111 may reset (step 818) the memory buffers, where the received signals were stored (step 804), and may recommence determining (step 802) whether signals have been received on the grant-free, contention-based transmission resource unit.

Upon determining (step 816) that not all stored received signals have been decoded, that is, that there still remain signals after the cancellation (step 814) of the interference from the successfully decoded transport block, the BS 111 may recommence applying (step 806) the rate-less decoder 214 to the stored received signals with the interference cancelled. Notably, the UE IDs that are used in subsequent attempts to descramble (step 808) the CRC may have the UE IDs of already decoded transport blocks removed.

Although the method 800 of FIG. 8 has been described as being carried out by the BS 111 in the context of reception of an uplink transmission from the UE 101, it should be clear that, with minor variations, the method 800 of FIG. 8 may be carried out by the UE 101 in the context of reception of a downlink transmission from the BS 111. In one example variation, the transmission (step 812) of the positive acknowledgement is toward the BS 111. Additionally, once the UE 101 has successfully decoded (step 806) a signal, there is no need to decode the remainder of the signals.

Figure 9:
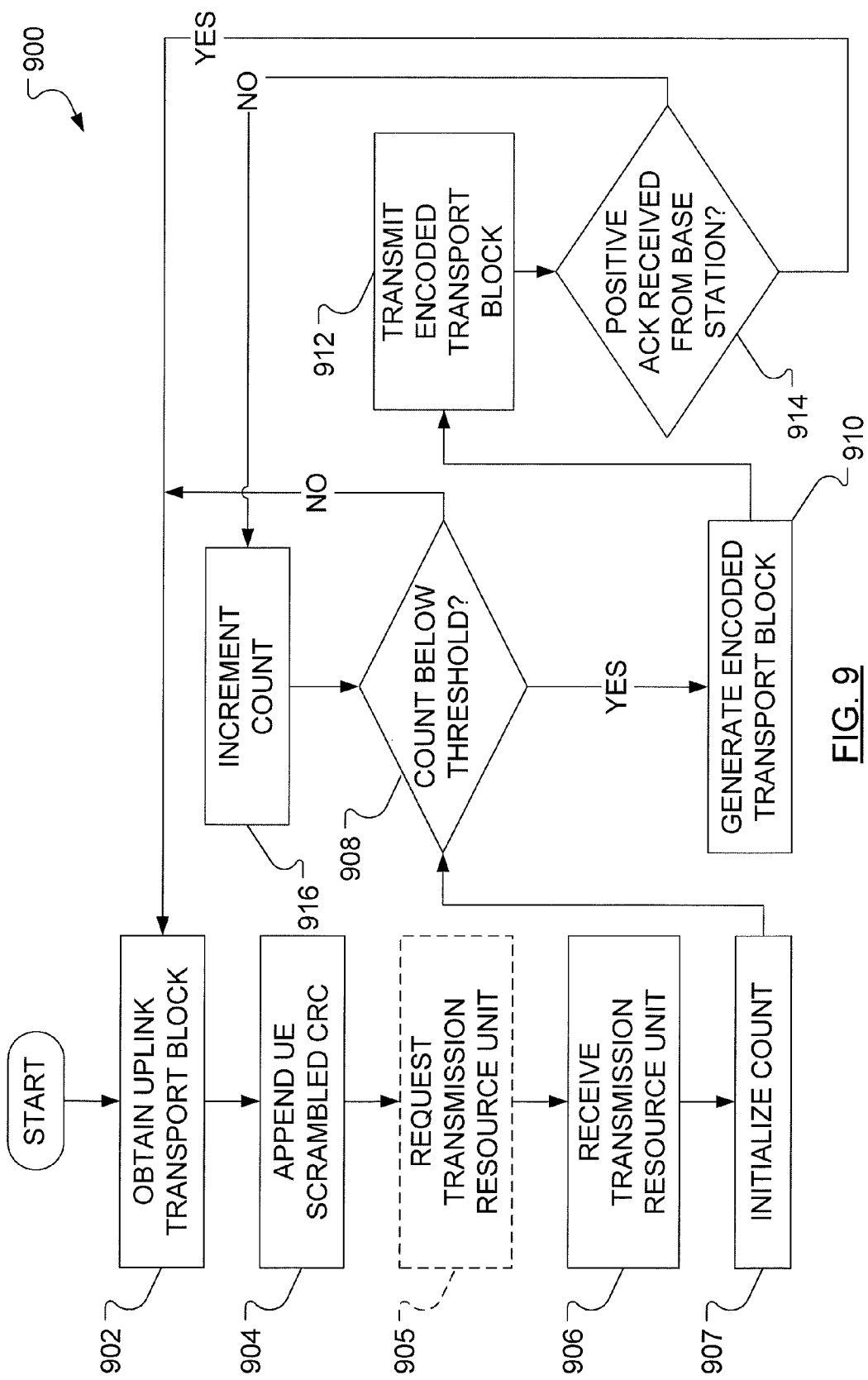
FIG. 9 illustrates steps in an example method for uplink transmission of encoded transport blocks in a grant-based, contention-free rate-less random access scheme.

FIG. 9 illustrates steps in an example method 900 for uplink transmission of encoded transport blocks in a grant-based, contention-free rate-less random access scheme.

Figure 4:
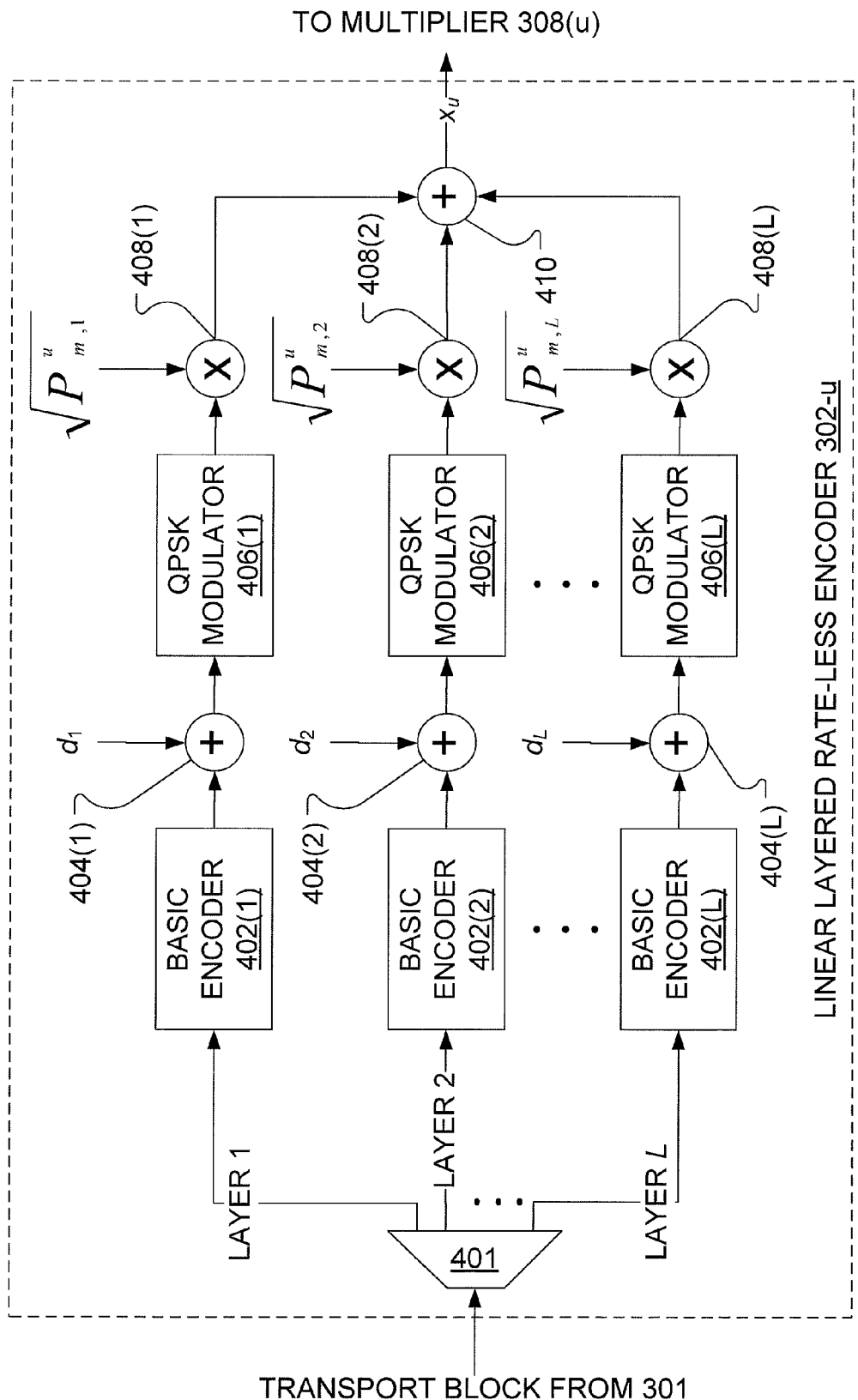
FIG. 4 illustrates an example of a linear layered rate-less encoders for use in the BS rate-less encoder of FIG. 3, in accordance with one embodiment of the present application.

Initially, the UE 101 obtains (step 902) an uplink transport block. The UE rate-less encoder 204 may include a transport block divider, such as illustrated as the transport block divider 401 in the linear layered rate-less encoder 302-u of FIG. 4 and, using the transport block divider, may divide the obtained transport block into layers 504 (see FIG. 5). The UE 101 may optionally append (step 904) a CRC 506 to each of the layers 504. Further optionally, the UE 101 may scramble each CRC before appending the respective layer with the CRC. Indeed, the UE 101 may scramble the CRC in a manner that is specific to the UE 101 by basing the scrambling on an identifier (ID) associated with the UE 101, i.e., a UE ID, which may be known to the BS 111. In one instance, the UE ID may be explicitly included in a header of the obtained transport block. In another instance, the UE ID may be implicitly embedded in the obtained transport block.

The UE 101 may, optionally, then request (step 905), from the BS 111, a grant of a transmission resource unit. Indeed, the UE 101 may receive (step 906) a grant of a transmission resource unit without having requested such a grant. Responsive to the request, the UE 101 may receive (step 906) an indication of a transmission resource unit.

Upon receiving (step 906) a grant to the transmission resource unit, the UE 101 may then initialize (step 907) a count of rate-less transmissions and determine (step 908) whether a count of rate-less transmissions, for the current transport block, exceeds a threshold.

Upon determining (step 908) that the count of rate-less transmissions for the current transport block does not exceed the threshold, the UE 101 may encode the received transport block to generate (step 910) an encoded transport block.

The UE 101 may then transmit (step 912) the encoded transport block.

The UE 101 may then determine (step 914) whether a positive acknowledgement has been received from the BS 111. Upon determining (step 914) that a positive acknowledgement has not been received from the BS 111, the UE 101 may proceed to increment (step 916) the count of rate-less transmissions.

Again, upon determining (step 908) that the count of rate-less transmissions for the current transport block does not exceed the threshold, the UE 101 may encode the transport block to generate (step 910) a further encoded transport block. The UE 101 may then transmit (step 912) the further encoded transport block.

Upon determining (step 914), this time, that a positive acknowledgement has been received from the BS 111, the UE 101 may proceed to obtain (step 902) another uplink transport block from the uplink transmission queue.

Upon determining (step 908) that the count of rate-less transmissions exceeds the threshold, the UE 101 returns to obtaining (step 902) another uplink transport block. That is, after trying multiple times to transmit a particular transport block and failing to receive an acknowledgement, the UE 101 may give up trying to send that particular transport block.

As an alternative to using a count that is initialized (step 907) and incremented (step 916), the UE 101 may employ a timer. In a manner similar to the count, the timer may be initialized. However, the timer is expected to proceed independent of further instructions. That is, it is unnecessary to increment the timer. Rather than determining (step 908) whether a count of rate-less transmissions, for the current transport block, exceeds a threshold, the UE may, instead, determine whether a time allotted for transmitting an encoded transport block and receiving a positive acknowledgement has expired.

Upon expiry of the timer, the UE 101 may request (step 905) a different transmission resource unit or do a random backoff and retransmit using the same transmission resource unit.

Although the method 900 of FIG. 9 has been described as being carried out by the UE 101 in the context of an uplink transmission to the base station 111, it should be clear that, with minor variations, the method 900 of FIG. 9 may be carried out by the base station 111 in the context of a downlink transmission to the UE 101.

Figure 10:
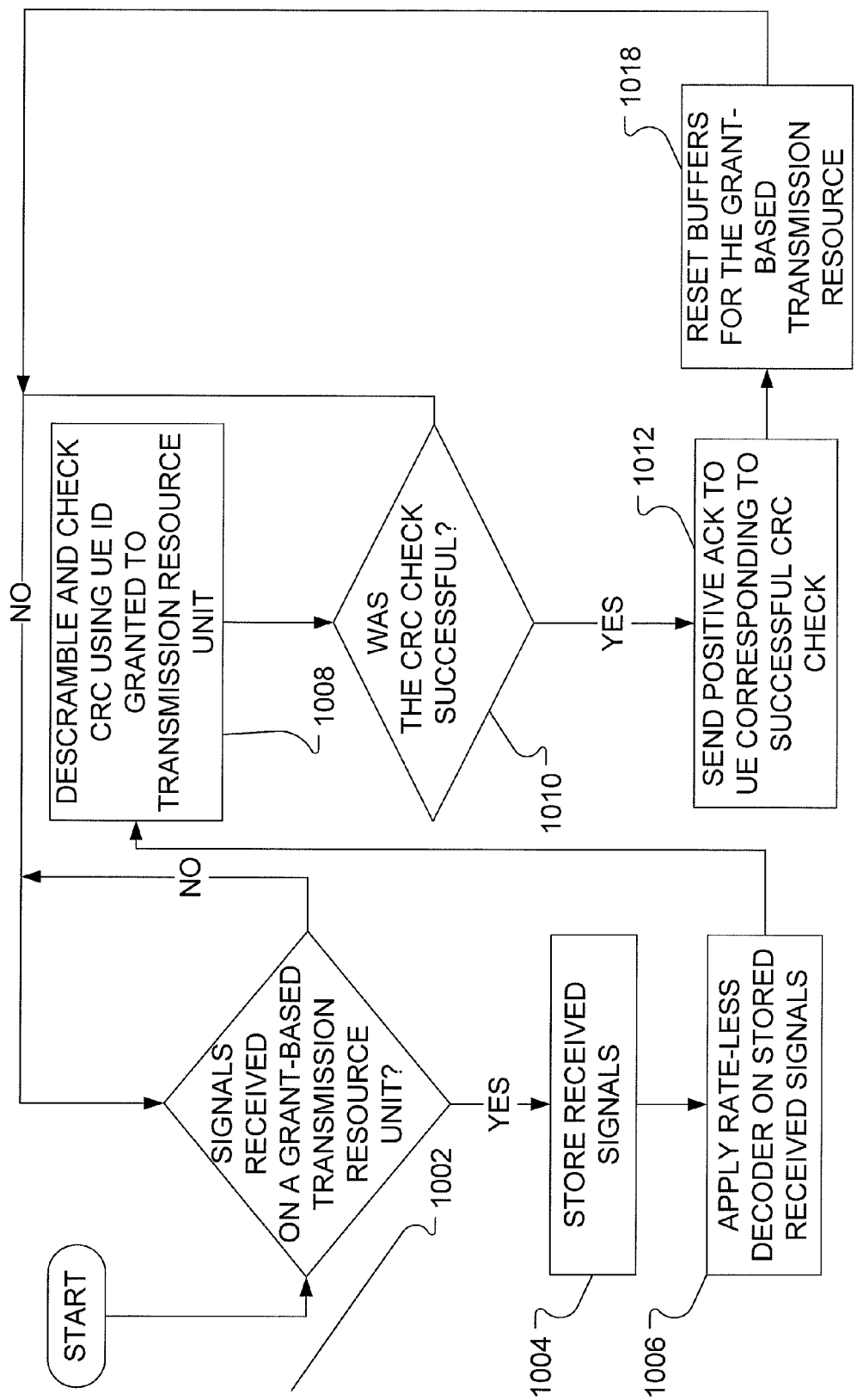
FIG. 10 illustrates example steps in a method for uplink reception of encoded transport blocks in a grant-based, contention-free rate-less random access scheme.

FIG. 10 illustrates example steps in a method 1000 for uplink reception of encoded transport blocks in a grant-based, contention-free rate-less random access scheme.

Initially, the BS 111 determines (step 1002) whether signals have been received on a particular transmission resource unit over the course of a transmission time interval (TTI). Upon determining (step 1002) that signals have been received, the BS 111 stores (step 1004) the signals for one TTI. The signals may be stored (step 1004), for example, in memory buffers associated with the transmission resource unit. At the conclusion of a TTI during which signals have been stored, the BS 111 then proceeds to apply (step 1006)

the rate-less decoder 214 to the stored received signals. Upon decoding a transport block, the BS 111 may identify the CRC portion of the transport block and descramble (step 1008) the CRC portion. Once the CRC is descrambled, the CRC may be used to check that the transport block has been properly decoded. Descrambling (step 1008) the CRC may, for example, involve using the UE IDs that has been granted the transmission resource unit. As discussed hereinbefore, each UE 101 may scramble the CRC for a transport block in a manner that is specific to the UE 101 by basing the scrambling on the UE ID associated with the UE 101.

The BS 111 may then determine (step 1010) whether the CRC check was successful.

On one hand, upon determining (step 1010) that the CRC check was successful, the BS 111 may transmit (step 1012) a positive acknowledgement to the UE 101 corresponding to the UE ID that was granted the transmission resource unit.

On the other hand, upon determining (step 1010) that the CRC check was unsuccessful, the BS 111 may recommence determining (step 1002) whether signals have been received on the transmission resource unit.

After transmitting (step 1012) the positive acknowledgement, the BS 111 may reset (step 1018) the memory buffers, where the received signals were stored (step 1004), and may recommence determining (step 1002) whether signals have been received on the transmission resource unit.

Although the method 1000 of FIG. 10 has been described as being carried out by the BS 111 in the context of reception of an uplink transmission from the UE 101, it should be clear that, with minor variations, the method 1000 of FIG. 10 may be carried out by the UE 101 in the context of reception of a downlink transmission from the BS 111.

Aspects of the present application involve use of PLRCs in lieu of traditional fixed-rate FEC codes to enable uplink grant-free random access and grant-based uplink/downlink non-orthogonal multiple access in wireless networks. Employing PLRCs may be considered to be a different transmission paradigm than applying upper-layer fountain codes, which are suitable for erasure channels and usually involve use of fixed-rate codes at the physical layer. For upper-layer fountain codes, if a transport block is not successfully decoded at the physical layer, it is discarded and does not accumulate any information towards the decoding of the upper-layer message. However, with PLRCs, each transport block contributes to the information accumulation at the receiver even though each transport block may not be self-decodable.

Another benefit of using PLRC for grant-free uplink random access is due to the inherent property of the random multiple access scheme. In a grant-free random access system where users still rely on traditional link adaptation, each user would select its modulation and coding (MCS) scheme while trying to maximize its transmission rate according to its own channel conditions unbeknownst of other users who may be concurrently transmitting on the same contention-free resource unit. If say UE 1 and UE 2 are transmitting simultaneously using transmission rates $R_1$ and $R_2$ respectively, then the BS can decode both transmissions only if the following conditions are satisfied:

$$R_1 \le C_1$$

$$R_2 \le C_2$$

$$R_1 + R_2 \le C$$

Where $C_1$ is the single-user capacity of the channel from UE 1 to the BS, $C_2$ is the single-user capacity of the channel from UE 2 to the BS, and C is the capacity of the multiple channel. In a conventional grant-free system (not using physical layer rate-less coding) UE 1 and UE 2 can choose their respective transmission rates $R_1$ and $R_2$ so as to be as close as possible from the single-user channel capacity $C_1$ and $C_2$ respectively. In doing so, their sum rate $R_1+R_2$ runs the risk of exceeding the multiple channel capacity C. In case of a collision between the transport blocks of UE 1 and UE 2, which have been transmitted simultaneously and, therefore, are received simultaneously at the BS, the BS would be unable to decode either of them, in which case the two packets are lost due to collision and both UEs usually go through a retransmission protocol such as Hybrid Automatic repeat Request (HARQ). Again, the retransmitted packets run the risk of colliding and being lost. In order to avoid such scenarios, conventional grant-free systems tend to be conservative and transmit at a low MCS, i.e., $R_1$ is far from the single-user channel capacity which is sub-optimal. When using physical layer rate-less codes all these considerations are alleviated, since PLRCs are designed to inherently adapt to time-varying channel conditions and, in doing so, inherently handle potential collisions, which is a very beneficial feature in the case of grant-free random access channels.

Conveniently, when PLRCs are used, there is no need for per-transport block ACK/NACK signaling. Because there is no need for explicit link adaptation, feedback overhead and control resources are preserved. Aspects of the proposed scheme benefit from not trying to predict and adjust to channel variations. As such, these aspects work equally well irrespective of terminal speed. Notably, non-orthogonal multiple access without spreading, as proposed hereinbefore, may be seen to lead to increased radio access capacity. Aspects of the present application support grant-free, contention-based, random access and grant-based contention-free non-orthogonal multiple access, thereby leading to Rate-less non-orthogonal multiple access (R-NOMA), Rate-less semi-orthogonal multiple access (R-SOMA) and Rate-less sparse code multiple access (R-SCMA).

The above-described implementations of the present application are intended to be examples only. Alterations, modifications and variations may be effected to the particular implementations by those skilled in the art without departing from the scope of the application, which is defined by the claims appended hereto.

What is claimed is:

1. A method at a transmitter for transmission of a transport block, the method comprising:
   appending a cyclic redundancy check to the transport block;
   selecting a grant-free transmission resource unit;
   encoding, using physical layer rate-less coding, the transport block to generate an encoded transport block; and
   transmitting the encoded transport block to a receiver over the grant-free transmission resource unit.

2. The method of claim 1 further comprising repeating:
   the encoding, using physical layer rate-less coding, the transport block, to generate a further encoded transport block; and
   transmitting the further encoded transport block to the receiver.

3. The method of claim 2 further comprising:
   receiving an acknowledgment from the receiver; and
   responsive to the receiving, discontinuing the repeating.

4. The method of claim 2 further comprising:
   maintaining a count of the transmissions;
   determining that the count has exceeded a threshold; and responsive to the determining, discontinuing the repeating.

5. The method of claim 2 further comprising:
maintaining a timer during the transmissions;
determining that the timer has expired; and
responsive to the determining, discontinuing the repeating.

6. The method of claim 1 wherein the transmitter is a base station and the receiver is user equipment and the method further comprises forming a sum of the encoded transport block with a plurality of other encoded transport blocks, wherein transmitting the encoded transport block to the receiver includes transmitting the sum to the receiver.

7. The method of claim 1 wherein the selecting of the grant-free transmission resource unit comprises selecting from among grant-free transmission resource units that have been announced a-priori by the receiver.

8. The method of claim 1 wherein the selecting of the grant-free transmission resource unit comprises selecting from among grant-free transmission resource units that have been mapped a-priori by the receiver to a subset of potential transmitters.

9. An apparatus for transmission of a transport block, the apparatus comprising:
an encoder configured to:
append a cyclic redundancy check to the transport block;
select a grant-free transmission resource unit; and
encode, using physical layer rate-less coding, the transport block, to generate an encoded transport block; and
a transmitter configured to transmit the encoded transport block to a receiver over the grant-free transmission resource unit.

10. The apparatus of claim 9 wherein the transmitter comprises a base station and the receiver comprises user equipment and the transmitter further comprises an adder configured to form a sum of the encoded transport block with a plurality of other encoded transport blocks, wherein transmitting the encoded transport block to the receiver includes transmitting the sum to the receiver.

11. The apparatus of claim 9 wherein the encoder is further configured to select the grant-free transmission resource unit by selecting from among grant-free transmission resource units that have been announced a-priori by the receiver.

12. The apparatus of claim 9 wherein the encoder is further configured to select the grant-free transmission resource unit by selecting from among grant-free transmission resource units that have been mapped a-priori by the receiver to a subset of potential transmitters.

13. A method comprising:
receiving, at a receiver, signals on a transmission resource unit;
storing the received signals;
rate-less decoding the received signals to obtain a transport block, the transport block being associated with a scrambled cyclic redundancy check;
descrambling, using an identifier associated with a transmitter of the transport block, the scrambled cyclic redundancy check to yield an unscrambled cyclic redundancy check; and
transmitting, to the transmitter of the transport block, a positive acknowledgement.

14. The method of claim 13 further comprising:
confirming, using the unscrambled cyclic redundancy check, that the transport block has been successfully decoded; and
only transmitting the positive acknowledgement responsive to the confirming.

15. The method of claim 13 further comprising:
cancelling, from the stored received signals, interference attributable to the decoded transport block, to yield interference-cancelled received signals; and
storing the interference-cancelled received signals.

16. The method of claim 15 further comprising rate-less decoding the interference-cancelled received signals to obtain a further transport block.

17. The method of claim 13 wherein the identifier of the transmitter is mapped to the transmission resource unit.

18. The method of claim 13 wherein in the storing the received signals comprises storing the received signals in memory buffers associated with the transmission resource unit.

19. The method of claim 18 further comprising, responsive to the confirming, resetting the memory buffers.

20. The method of claim 13 further comprising:
determining, using the unscrambled cyclic redundancy check, that the transport block has not been successfully decoded; and
reiterating the descrambling, using an identifier associated with a possible transmitter of the transport block, the scrambled cyclic redundancy check to yield an unscrambled cyclic redundancy check until determining, using the unscrambled cyclic redundancy check, that the transport block has been successfully decoded.

21. The method of claim 13, wherein the transmission resource unit is a grant-free transmission resource unit.

22. An apparatus comprising:
a receiver configured to receive signals on a transmission resource unit;
a decoder configured to:
store the received signals;
decode, in a rate-less manner, the received signals to obtain a transport block, the transport block being associated with a scrambled cyclic redundancy check; and
descramble, using an identifier associated with a transmitter of the transport block, the scrambled cyclic redundancy check to yield an unscrambled cyclic redundancy check; and
a transmitter configured to transmit, to a transmitter of the transport block, a positive acknowledgement.

23. The apparatus of claim 22, wherein the transmission resource unit is a grant-free transmission resource unit.

24. The apparatus of claim 22, wherein the decoder is further configured to confirm, using the unscrambled cyclic redundancy check, that the transport block has been successfully decoded; and wherein the transmitter is configured to only transmit the positive acknowledgement responsive to the confirming.

25. The apparatus of claim 22, wherein the decoder is further configured to:
cancel, from the stored received signals, interference attributable to the decoded transport block, to yield interference-cancelled received signals;
store the interference-cancelled received signals.

26. The apparatus of claim 25, wherein the decoder is further configured to decode, in a rate-less manner, the interference-cancelled received signals to obtain a further transport block.

27. The apparatus of claim 22, wherein the decoder is further configured to:
  determine, using the unscrambled cyclic redundancy check, that the transport block has not been successfully decoded; and
  reiterate the descrambling, using an identifier associated with a possible transmitter of the transport block, the scrambled cyclic redundancy check to yield an unscrambled cyclic redundancy check until it is determined, using the unscrambled cyclic redundancy check, that the transport block has been successfully decoded.

* * * * *